Patented June 29, 1926.

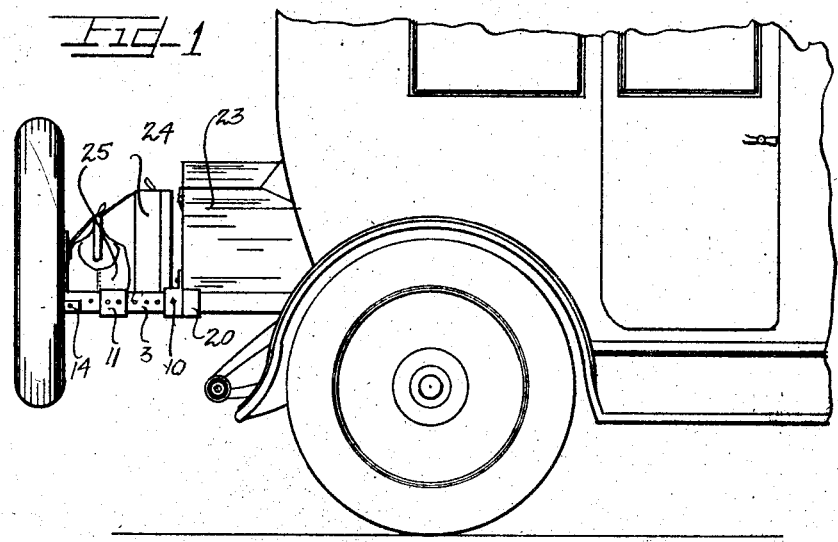
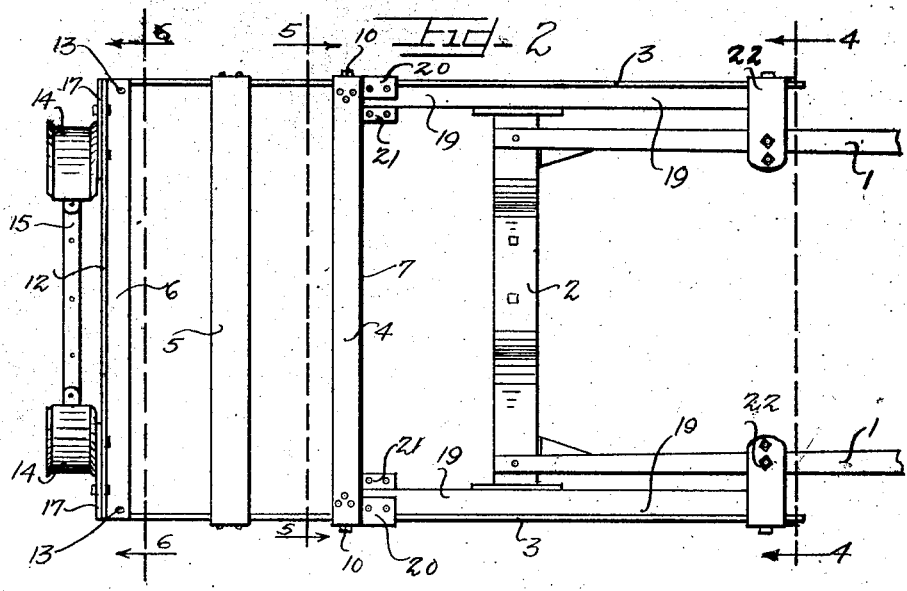

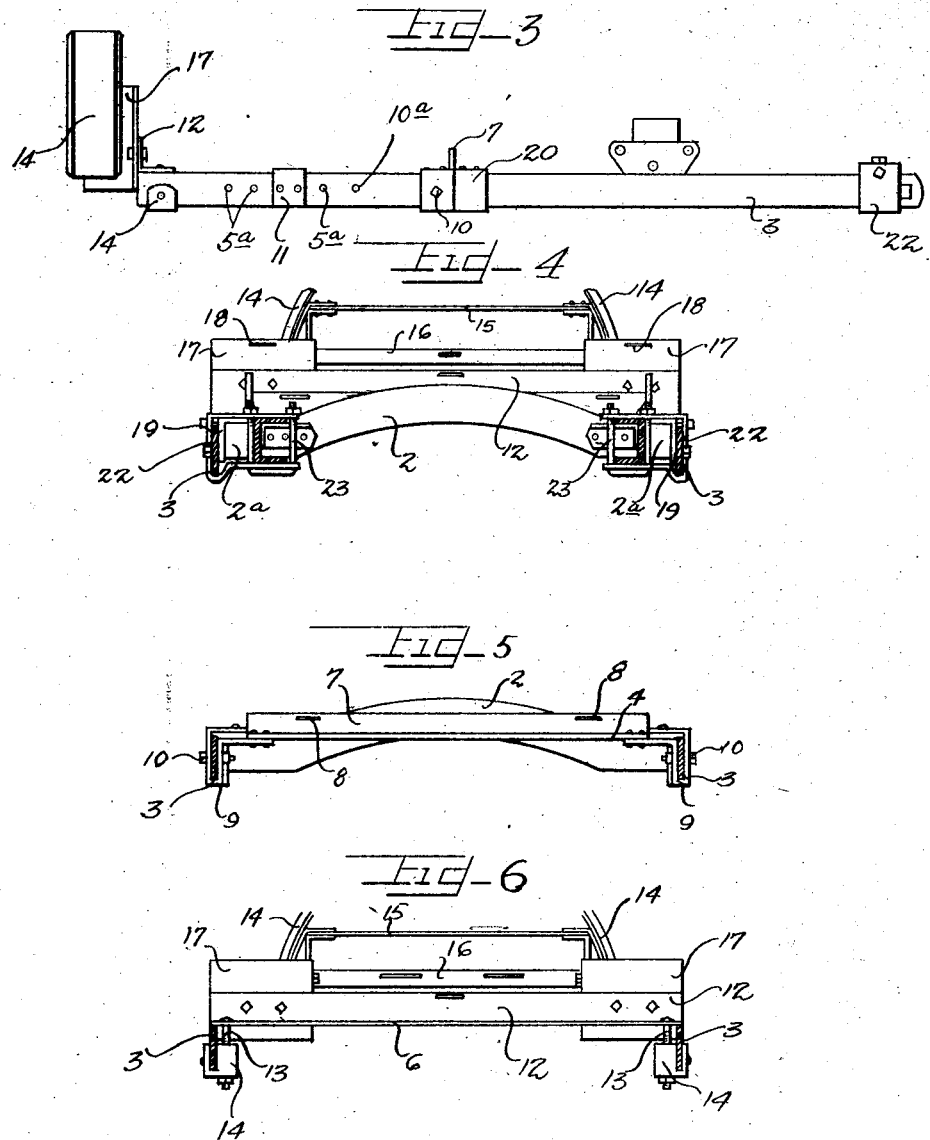

1,590,972

UNITED STATES PATENT OFFICE.

WALTER R. GREEN, OF CHICAGO, ILLINOIS.

ADJUSTABLE LUGGAGE CARRIER AND TRUNK RACK.

Application filed March 24, 1924. Serial No. 701,267.

This invention relates to a combined luggage and tire carrier, and involves a rack having adjustable parts and that is adjustably secured for projecting different distances beyond the rear of an automobile with means thereon for supporting spare tires.

The invention comprises the novel structure and combination hereinafter described and more particularly pointed out and defined in the appended claims.

In the accompanying drawings which illustrate a preferred form of this invention and in which similar reference numerals refer to similar features in the different views:

Figure 1 is a fragmentary elevational view of an automobile with the rearwardly projecting luggage rack.

Figure 2 is an enlarged top plan view of the rack.

Figure 3 is an enlarged elevational view of the rack.

Figure 4 is an enlarged section upon the line 4—4 of Figure 2.

Figure 5 is an enlarged sectional view upon the line 5—5 of Figure 2.

Figure 6 is an enlarged sectional view upon the line 6—6 of Figure 2.

In the drawings are illustrated certain parts of the automobile chassis which serve to support the luggage rack and tire carrier. These parts are the side rails 1 which are in the form of channel sections and the rear transverse member 2, the ends of which project through the webs of the channel members 1 and extend therebeyond for a short distance.

The luggage carrier or rack consists of a platform comprising side members 3 which are in the form of flat bars and which are connected by transverse members 4, 5 and 6.

The transverse member 4 has an upstanding flange 7 provided with strap slots 8. It is adjustably secured to the side bars 3 by means of metal straps 9 which encompass the side bars 3 with their ends extending inwardly in parallel spaced relation; the ends of the member 4 being secured between the ends of the straps by bolts or rivets or in any approved manner. The metal straps are adjustably secured to the side bars by means of bolts 10 which may be connected through other apertures such as 10ª. It will be appreciated that by removing the bolts 10, the straps may be slid along the bars.

The transverse member 5 has depending flanges 11 which are adapted to be removably bolted to the side bars through a series of openings 5ª.

The transverse member 6 is provided with an upstanding flange 12. It is adjustably attached to the side bars by means of the bolts 13 which extend through lugs 14 (Figure 6) which are attached to the side bars 3. The upstanding flange 12 forms an attaching means for a tire carrier which will now be described.

The tire carrier consists of a pair of arcuate side members 14 which are rigidly connected in spaced relation by transverse bars 15 and 16 in any well known manner. A pair of angular attaching members 17 are used to attach the carrier to the flange 12. These angular members have one flange attached to the inner side of the arcuate tire supports 14; the other flange being attached to the flange 12. These latter flanges extend above the flange 12 and are provided with strap slots 18.

The side bars 3 extend a considerable distance beyond the transverse member 4 to afford a sufficient length for attachment to the chassis. And as a trunk or the like is adapted to be supported upon the forward part of the rack, additional supporting means in the form of angle bars 19 extend forwardly from the transverse member 4. These angle bars and side bars are suitably clamped at their forward ends to the side beams 1 of the chassis in a manner to be later set forth. At intermediate points, these angle bars are hung upon the ends 2ª of the member 2 of the chassis as shown in Figure 4. The rear ends of the angle bars 19 are connected to the side bars 3 by means of metal straps 20 which extend around the side bars 3 and the angle bars 19; the ends thereof being brought up upon opposite sides of the horizontal flanges of the angle bars 19 and secured thereto by bolts or the like. The ends of these straps that encompass the interior of the angle bars 19 are extended beyond the horizontal flanges thereof as indicated at 21 and they are suitably apertured to provide attaching means for the trunk.

The forward ends of the angle bars 19 and side bars 3 are adjustably clamped or secured to the side rails 1 by means of U-shaped members 22, the arms of which extend over the top and bottom of the rails 1, and are secured thereto by U-bolts 23. A bolt or rivet may be used to attach each member 22 to the side bars 3. It should be noted that the side bars 3 are pressed against the backs of the angle bars 19 which are held upon the ends of the member 2 by the U-shaped clamps 22. It should also be noted that each clamp 22 has depending restricted portions to form a groove for receiving the lower edge of each side bar 3 as shown in Figure 4.

It will be appreciated that the clamps 22 may be attached at any suitable points along the side beams 1 whereby the carrier may project rearwardly a greater or lesser extent. It will also be appreciated that the transverse members 4 and 5 may be shifted upon the side bars 3 to vary the spaces or compartments for holding various luggage. In Figure 1 there is shown a trunk 23 supported upon the carrier with its rear end abutting the flange 7 of the transverse member 4; screws or bolts may attach the trunk to the extended flanges 21 of the metal straps 20. Other luggage such as a suit case 24 and a bag 25 may be carried between the member 4 and the tire carrier and may be strapped to the carrier by suitable straps extending through the aforementioned slots 8 and 18 as is obvious.

I am aware that numerous details of construction may be varied through a wide range without departing from the principles of this invention, and I therefore do not purpose limiting the patent granted, otherwise than necessitated by the prior art.

I claim as my invention:

1. In a luggage carrier for vehicles having side rails and a rear transverse member, a pair of angle members supported at intermediate points upon said transverse member, a side bar positioned against each angle member and projecting beyond the rear end of such angle member, a clamp for clamping each side bar and its angle member to a side rail of the vehicle, and an adjustable transverse member connecting the projecting portions of said side bars, and a metal strap connecting the rear end of each angle member with a side member, said straps having inwardly projecting apertured ends for the purpose set forth.

2. In a luggage carrier for vehicles having side rails and a rear transverse member, a pair of angle members hung at intermediate points upon said transverse member, one flange of each angle member depending over the end of said transverse member, a side bar positioned against the depending flange of each angle member, a clamp simultaneously connecting each side bar and its accompanying angle member to a side rail of the vehicle, means for connecting the rear ends of said angle members to said side bars, said side bars projecting beyond the rear ends of said angle members, and adjustable transverse members connecting said side bars adjacent the rear ends of said angle members to provide a pair of compartments.

3. In a luggage carrier for a vehicle, a pair of angle members having a two point connection with the vehicle chassis, a side bar connected to the end portions of each angle member, and projecting rearwardly thereof, a transverse member spanning said side bars adjacent the rear ends of said angle members to provide a compartment for heavy loads on said angle members and a compartment for lighter loads on said side bars.

4. In a luggage carrier for vehicles having side rails and a rear transverse member, a pair of angle members hung at intermediate points upon the ends of said transverse member, each angle member having a flange depending over an end of the transverse member, a side bar adjacent each depending flange of said angle members, a clamp for connecting each side bar and its accompanying angle to the said side rails, means connecting the rear ends of said angle members and side bars, said side bars projecting beyond the rear ends of said angle members and a transverse member connecting said side bars and angle members at the rear juncture to provide a pair of luggage compartments, one on said angle members and one on the side bars.

In testimony whereof I have hereunto subscribed my name.

WALTER R. GREEN.